United States Patent
Hagdahl (10) Patent No.: US 12,390,737 B2
(45) Date of Patent: Aug. 19, 2025

(54) REAL-TIME INTERACTABLE ENVIRONMENT GEOMETRY DETECTION

(71) Applicant: Electronic Arts Inc., Redwood City, CA (US)

(72) Inventor: Joakim Hagdahl, Langley (CA)

(*) Notice: Subject to any disclaimer, the term of this patent is extended or adjusted under 35 U.S.C. 154(b) by 298 days.

(21) Appl. No.: 18/128,335

(22) Filed: Mar. 30, 2023

(65) Prior Publication Data

US 2024/0325921 A1    Oct. 3, 2024

(51) Int. Cl.
| A63F 13/63 | (2014.01) |
| A63F 13/55 | (2014.01) |
| A63F 13/573 | (2014.01) |
| A63F 13/577 | (2014.01) |
| A63F 13/60 | (2014.01) |

(52) U.S. Cl.
CPC .............. *A63F 13/63* (2014.09); *A63F 13/55* (2014.09); *A63F 13/573* (2014.09); *A63F 13/577* (2014.09); *A63F 13/60* (2014.09)

(58) Field of Classification Search
CPC ........ A63F 13/55; A63F 13/577; A63F 13/63; A63F 13/60; A63F 13/573
See application file for complete search history.

(56) References Cited

U.S. PATENT DOCUMENTS

| 6,961,055 B2* | 11/2005 | Doak ...................... A63F 13/63 345/677 |
| 9,259,646 B2* | 2/2016 | Kudo ...................... A63F 13/45 |
| 11,878,249 B2* | 1/2024 | Gisslén .................... A63F 13/70 |
| 2003/0058238 A1* | 3/2003 | Doak ....................... A63F 13/45 709/217 |
| 2013/0064456 A1* | 3/2013 | Kudo ....................... A63F 13/45 382/195 |
| 2013/0120385 A1* | 5/2013 | Krishnaswamy ........ G06T 15/50 345/426 |
| 2014/0340403 A1* | 11/2014 | Droske ................... G06T 15/06 345/426 |
| 2015/0375101 A1* | 12/2015 | George .................. A63F 13/497 463/24 |
| 2022/0305386 A1* | 9/2022 | Gisslén .................... A63F 13/60 |
| 2023/0343019 A1* | 10/2023 | Wald ....................... G06T 15/06 |
| 2024/0325917 A1* | 10/2024 | Hagdahl ............... A63F 13/577 |
| 2024/0325921 A1* | 10/2024 | Hagdahl ................. A63F 13/55 |

* cited by examiner

*Primary Examiner* — William H McCulloch, Jr.
(74) *Attorney, Agent, or Firm* — Lee & Hayes, P.C.

(57) ABSTRACT

A gaming system may provide for interactable environment geometry (IEG) detection. The gaming system detect one or more IEG features in an area of a virtual environment of a game including an avatar of a player, determine, for an IEG feature of the one or more potentially IEG features, one or more unprocessed potential interactions that are valid for the IEG feature, the determining that an individual unprocessed potential interaction of the one or more unprocessed potential interactions is a valid interaction for the IEG feature being based on corresponding criteria of the individual unprocessed potential interactions, and determine, based at least in part on a position of the avatar in the virtual environment, whether the valid interaction for the IEG feature is available for the avatar.

20 Claims, 7 Drawing Sheets

REAL-TIME INTERACTABLE ENVIRONMENT GEOMETRY DETECTION

BACKGROUND

Online gaming allows for players to play a variety of electronic and/or video games with each other via network connectivity such as via the Internet. Some games may involve environment customization, potentially in real-time during game play. However, frustration may arise if interactions with the customized environment geometry is limited, or the form of the customized environment geometry is limited.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describe methods, apparatuses, computer-readable media, and system(s) for providing interactable environment geometry (IEG) detection. More particularly, example methods, apparatuses, computer-readable media, and system(s) according to this disclosure may determine environment geometry features which may be interactable based on respective criteria of one or more interaction types. Further, IEG detection according to this disclosure may be performed during game play, as a character's in-game avatar moves through the virtual environment and/or changes are made to the environment's geometry.

In some examples, an IEG detection system may detect potential IEG features based on a location of an avatar in the environment. In some examples, the detection of potential IEG features may be performed to detect environment geometry feature types such as edges or surfaces in a virtual environment with which an avatar may interact. In some examples, the IEG detection system may perform detection of potential IEG features in an area surrounding an avatar. The IEG detection system may add potential IEG features to an IEG feature cache as unprocessed IEG features.

The IEG detection system may then determine, for individual unprocessed IEG features, which types(s) of interactions can be performed for the unprocessed IEG feature. The IEG detection system may then store the valid types of interactions for the individual unprocessed IEG feature in the IEG feature cache. Some example types of interactions for edges in a game may include mantling, hanging, shimmying, climbing, mounting, vaulting, and grinding. In some examples, each type of interaction may have a corresponding set of criteria to be met by an IEG feature for an avatar to perform the type of interaction with respect to that IEG feature. The set of criteria for a type of interaction may specify parameters such as ranges of lengths, widths, heights, or angles of an IEG feature for a corresponding type of interaction to be valid for the IEG feature. In some examples, the criteria of a type of interaction may also include criteria to be met by other features near the feature being processed. For example, a mantle up and over interaction for a top edge of a wall may include criteria that a parallel top edge on the other side of the wall be within a threshold distance from the top edge of the wall being processed. In another example, a type of interaction may include criteria specifying a range of heights over the surrounding ground the feature may be to be valid for an IEG feature.

The IEG detection system may then determine, for individual IEG features, which valid types of interaction are available for a specific avatar at a current time. For example, the IEG detection system may determine the valid types of interactions for an IEG feature based on the information stored in the IEG feature cache as discussed above. The IEG detection system may then perform collision checks for each valid type of interaction for the IEG feature to determine whether the type of interaction is available to the avatar at the current time. For example, a wall in a virtual environment may include an edge which is valid for a mantle and hang interaction. However, if another object, such as a car, moves between the avatar and the edge, the interaction of mantling and hanging from the edge of the wall becomes unavailable to the avatar at the current time.

As mentioned above, the IEG detection system may detect potential IEG features within an area around an avatar in the virtual environment. In some examples, the IEG detection system may remove IEG features from the IEG feature cache that are no longer in the area around an avatar (e.g., the avatar has moved away) or which correspond to altered environment geometry. For example, the IEG detection system may remove an IEG feature from the IEG feature cache if it was located in the detection area but has not detected as a potential IEG feature in the current iteration of the IEG feature detection operation (e.g., because the IEG feature has been removed or has changed to be distinct in the current iteration of the IEG feature detection operation).

In some examples, the IEG detection system may detect potential IEG features that have been added or removed from the environment during game play. For example, a video game may allow for user generated content support such that players playing in an shared game environment have access to a variety of tools and assets to create and modify the shared game environment in real time. A game system may relay the changes to the game clients of the other players. The game clients of the other players may incorporate the shared changes into local versions of the shared environment such that the avatars of the other players may be able to interact with the changed geometry in real time. Depending on the example, the detection of potential IEG features for a shared game environment may be performed by servers of the game system or by the game client devices of the players.

In some systems, multiple avatars may be present in the environment. In such an example, the removal of an IEG feature from the IEG feature cache may be performed when the IEG feature is no longer in an area around any of the multiple avatars. As discussed herein, an avatar may be a logical representation of a character in a video game rather than or in addition to a visual representation of the character.

In some examples, the detection of potential IEG features may reduce or combine potential IEG features (e.g., for efficiency or to avoid multiple potential IEG features being detected for the same IEG feature). For example, a skateboard game environment may include IEG features such as rails or pipes that may be rounded or have multiple segments, faces and/or edges that could be detected as potential IEG features. The IEG detection system may include functionality to determine that multiple potential IEG features represent a rail or pipe feature when the multiple potential IEG features are parallel, have different angular orientations around their length and are within a threshold spatial separation from one another. Further, the detection of potential IEG features may combine two or more potential IEG features that have end points close to one another and have a smooth angular transition along their length (e.g., which may describe segments of a handrail with a short gap).

The interactable environment geometry (IEG) detection techniques described herein can improve a functioning of a computing device by providing for dynamically determining how an avatar can interact with various objects and obstacles in a virtual environment. For example, the techniques described herein may allow for modification of the environment geometry of a game environment during game play while maintaining the availability of interactions with the modified game environment. Further, these techniques described herein may allow for level creation without manual specification of environment geometry that is to be interactable and/or what interactions apply to which environment geometry features. These and other improvements to the functioning of the computer are discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

Figure 1:
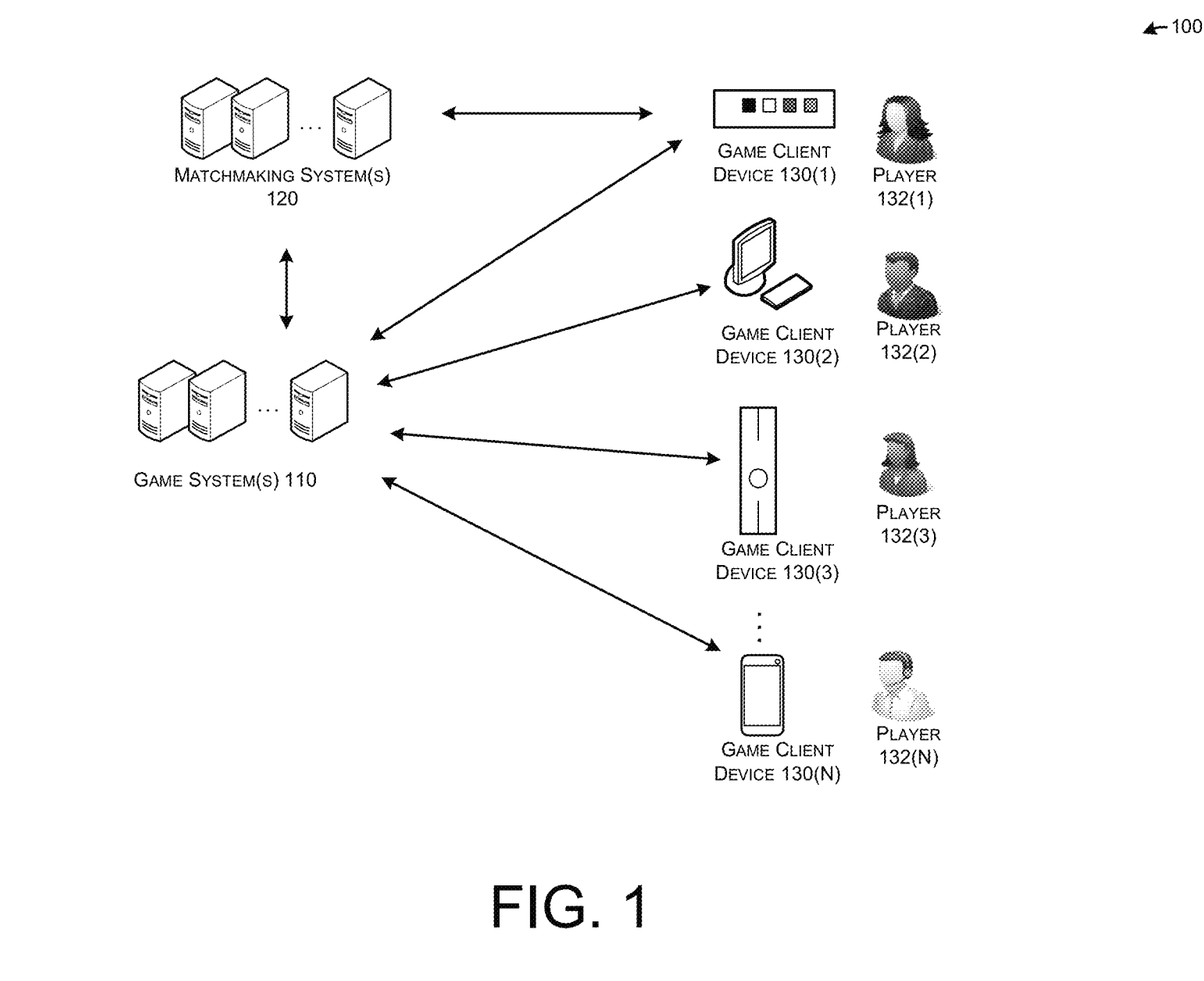
FIG. 1 illustrates a schematic diagram of an example environment with gaming system(s) that may provide for interactable environment geometry (IEG) detection, in accordance with example embodiments of the disclosure.

FIG. 1 illustrates a schematic diagram of an example environment 100 with game system(s) 110, matchmaking system(s) 120, and game client device(s) 130 that may provide for interactable environment geometry (IEG) detection, in accordance with example embodiments of the disclosure.

The example environment 100 may include one or more player(s) 132(1), 132(2), 132(3), . . . 132(N), hereinafter referred to individually or collectively as player(s) 132, who may interact with respective game client device(s) 130(1), 130(2), 130(3), . . . 130(N), hereinafter referred to individually or collectively as game client device(s) 130 via respective input device(s). It should be understood that, as used herein, a player can refer to (i) a person playing or participating in a video game; (ii) systems or devices corresponding to, associated with, operated by and/or managed by a player; and/or (iii) accounts and/or other data or collections of data associated with or corresponding to a player.

The game client device(s) 130 may receive game state information from the one or more game system(s) 110 that may host the online game played by the player(s) 132 of environment 100. The game state information may be received repeatedly and/or continuously and/or as events of the online game transpire. The game state information may be based at least in part on the interactions that each of the player(s) 132 have in response to events of the online game hosted by the game system(s) 110.

The game client device(s) 130 may be configured to render content associated with the online game to respective player(s) 132 based at least on the game state information. More particularly, the game client device(s) 130 may use the most recent game state information to render current events of the online game as content. This content may include video, audio, haptic, combinations thereof, or the like content components.

As events transpire in the online game, the game system(s) 110 may update game state information and send that game state information to the game client device(s) 130. For example, if the player(s) 132 are playing an online soccer game, and the player 132 playing one of the goalies moves in a particular direction, then that movement and/or goalie location may be represented in the game state information that may be sent to each of the game client device(s) 130 for rendering the event of the goalie moving in the particular direction. In this way, the content of the online game is repeatedly updated throughout game play. Further, the game state information sent to individual game client device(s) 130 may be a subset or derivative of the full game state maintained at the game system(s) 110. For example, in a team deathmatch game, the game state information provided to a game client device 130 of a player may be a subset or derivative of the full game state generated based on the location of the player in the game simulation.

When the game client device(s) 130 receive the game state information from the game system(s) 110, a game client device 130 may render updated content associated with the online game to its respective player 132. This updated content may embody events that may have transpired since the previous state of the game (e.g., the movement of the goalie).

The game client device(s) 130 may accept input from respective player(s) 132 via respective input device(s). The input from the player(s) 132 may be responsive to events in the online game. For example, in an online basketball game, if a player 132 sees an event in the rendered content, such as an opposing team's guard blocking the point, the player 132 may use his/her input device to try to shoot a three-pointer. The intended action by the player 132, as captured via his/her input device, may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various player(s) 132 and update the state of the online game based thereon. As the state of the online game is updated, the state may be sent to the game client device(s) 130 for rendering online game content to player(s) 132. In this way, the game system(s) 110 may host the online game.

The example environment 100 may further include matchmaking system(s) 120 to match player(s) 132 who wish to play the same game and/or game mode with each other and to provide a platform for communication between the player(s) 132 playing online games (e.g., the same game and/or different games). The matchmaking system(s) 120 may receive an indication from the game system(s) 110 of player(s) 132 who wish to play an online game.

The matchmaking system(s) 120 may attempt matchmaking between player(s) 132. The matchmaking system(s) 120 may access information about the player(s) 132 who wish to play a particular online game, such as from a player datastore. A user account for each of the player(s) 132 may associate various information about the respective player(s) 132 and may be stored in the player datastore and accessed by the matchmaking system(s) 120.

Player(s) 132 may be matched according to one or more metrics associated with the player(s) 132 such as skill at a particular game. In addition to or alternatively to skill scores, player(s) 132 may be matched on a variety of other factors. Some example matchmaking factors may be related to behavior in addition to skill and may include a player's playstyle.

Having matched the player(s) 132, the matchmaking system(s) 120 may instruct generation of instance(s) of the online game(s) for the match(es). More particularly, the matchmaking system(s) 120 may request the game system(s) 110 instantiate an online game between the matched player(s) 132. For example, the matchmaking system(s) 120 may provide connection information for the game client device(s) 130 to the game system(s) 110 for instantiation of an instance of the online game between the matched player(s) 132.

The game system(s) 110 and or game client device(s) 130 may further include an interactable environment geometry (IEG) detection functionality to provide for the detection of IEG features and the determination of what interaction are valid and/or available for the detected IEG features. The following discussion relates to an example in which IEG detection is performed by the game client device(s) 130 and subsequent inputs by the player(s) 132 may be relayed to the game system(s) 110 along with an identification of an IEG feature that the avatar is interacting with and the type of interaction. However, examples are not so limited. For example, other examples may include the game system(s) 110 performing the IEG detection functionality and either providing identification of IEG features and valid and available types of interactions to the game client device(s) or in which the game system(s) 110 handle the interaction of avatars with IEG features. Moreover, some examples of this disclosure may include local game play and other variations.

In some examples, a potential IEG detection module of the game client device(s) 130 may detect potential IEG features based on a location of avatar(s) in the virtual environment. In some examples, the detection of potential IEG features may be performed to detect environment geometry feature types such as edges or surfaces in a virtual environment which an avatar may interact with. In some examples, the potential IEG detection module may perform detection of potential IEG features in an area surrounding an avatar. The potential IEG detection module may add potential IEG features to an IEG feature cache as unprocessed IEG features.

An IEG feature determination module of the game client device(s) 130 may then determine, for individual unprocessed IEG features, which types(s) of interactions can be performed for the unprocessed IEG feature. The IEG feature determination module may then store the valid types of interactions for the individual unprocessed IEG feature in the IEG feature cache. Some example types of interactions for edges in a game may include mantling, hanging, shimmying, climbing, mounting, vaulting, and grinding. In some examples, each type of interaction may have a corresponding set of criteria to be met by an IEG feature for an avatar to perform the type of interaction with respect to that IEG feature. The set of criteria for a type of interaction may specify parameters such as ranges of lengths, widths, or angles of an IEG feature the type of interaction to be valid for the IEG feature. In some examples, the criteria of a type of interaction may also include criteria to be met by other features near the feature being processed. For example, a mantle up and over interaction for a top edge of a wall may include a criteria that a parallel top edge on the other side of the wall be within a threshold range from the top edge of the wall being processed.

An available interaction module of the game client device(s) 130 may then determine, for individual IEG features, which valid types of interaction are available for a specific avatar at a current time. For example, the available interaction module may determine the valid types of interactions for an IEG feature in the IEG feature cache. The available interaction module may then perform collision checks for the IEG feature for each type of interaction determined to be valid for the IEG feature to determine whether the interaction is available to the avatar at a current time. For example, a wall in a virtual environment may include an edge which is valid for a mantle and hang interaction. However, if another object, such as a car, moves between the avatar and the edge, the interaction of mantling and hanging from the edge of the wall becomes unavailable to the avatar at the current time.

The IEG feature determination module or the available interaction module may further determine, for some interactions, interaction locations within the IEG features for the interaction. For example, for a mantle and hang interaction with an edge in the environment, an attachment point for the avatar may be determined. In an example in which the edge is relatively short, the determination of the attachment point may bias the avatar to a middle of the edge. Additionally or alternatively, in an example in which the edge is relatively wide or long, the determination of the attachment point may bias the avatar to a location along the edge nearest the avatar's location prior to the initiation of the interaction.

As mentioned above, the detection of potential IEG features may detect potential IEG features within an area around an avatar in the environment. In some examples, the potential IEG detection module may further remove IEG features in the IEG feature cache that are no longer in the area around an avatar (e.g., the avatar has moved away) or which correspond to altered environment geometry. For example, the potential IEG detection module may remove an IEG feature from the IEG feature cache if it was located in the detection area but was not detected as a potential IEG feature in the current iteration of the IEG feature detection operation (e.g., because the IEG feature has been removed or has changed to be distinct in the current iteration of the IEG feature detection operation).

In some examples, the potential IEG detection module may detect potential IEG features that have been added or removed from the environment during game play. For example, a video game may allow for user generated content support such that players playing in an shared game environment have access to a variety of tools and assets to create and modify the shared game environment in real time. The game system(s) 110 may relay the changes to the game client device(s) 130 of the other players. The game clients of the other players may incorporate the shared changes into local versions of the shared environment such that the avatars of the other players may be able to interact with the changed geometry in real time. Depending on the example, the detection of potential IEG features for a shared game environment may be performed by servers of the game system or by the game client devices of the players. Further, in some examples, game client device(s) 130 may share IEG feature data, for example, when their respective player avatars are proximate to one another.

In some systems, multiple avatars may be present in the environment. In addition to multiplayer gameplay, a game client device 130 associated with an avatar of a player may also control non-player characters. In such an example, the removal of an IEG feature from the IEG feature cache may be performed when the IEG feature is no longer in the area around any of the multiple avatars.

In some examples, the detection of potential IEG features may reduce or combine potential IEG features (e.g., for efficiency or to avoid multiple potential IEG features being detected for the same IEG feature). For example, a skateboard game environment may include IEG features such as rails or pipes that may be rounded or have multiple segments, faces and/or edges that could be detected as potential IEG features. The potential IEG detection module may include functionality to determine that multiple potential IEG features represent a same rail or pipe feature when the multiple potential IEG features are parallel, have different angular orientations around their length and are within a threshold spatial separation from one another. Further, the detection of potential IEG features may combine two or more potential IEG features that have end points close to one another and have a smooth angular transition along their length (e.g., which may describe segments of a handrail with a short gap).

Variations would be apparent based on this disclosure. Additional details regarding gaming systems that may provide interactable environment geometry (IEG) detection during game play are illustrated in FIGS. 2A-5 and discussed below.

Figure 2A:
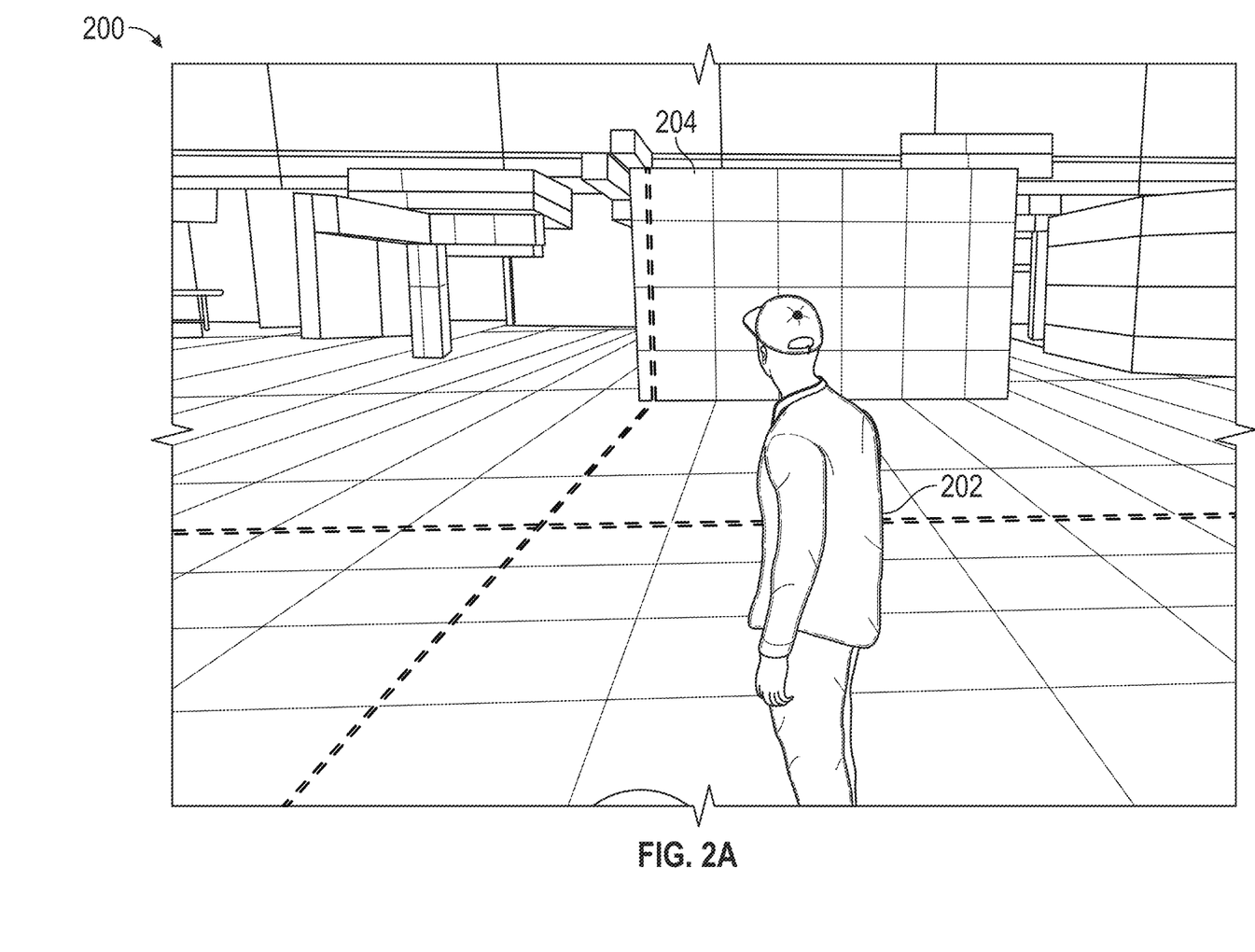
FIGS. 2A-2C illustrate views of an example virtual environment in which IEG detection may be performed during game play, in accordance with example embodiments of the disclosure.
Figure 2B:
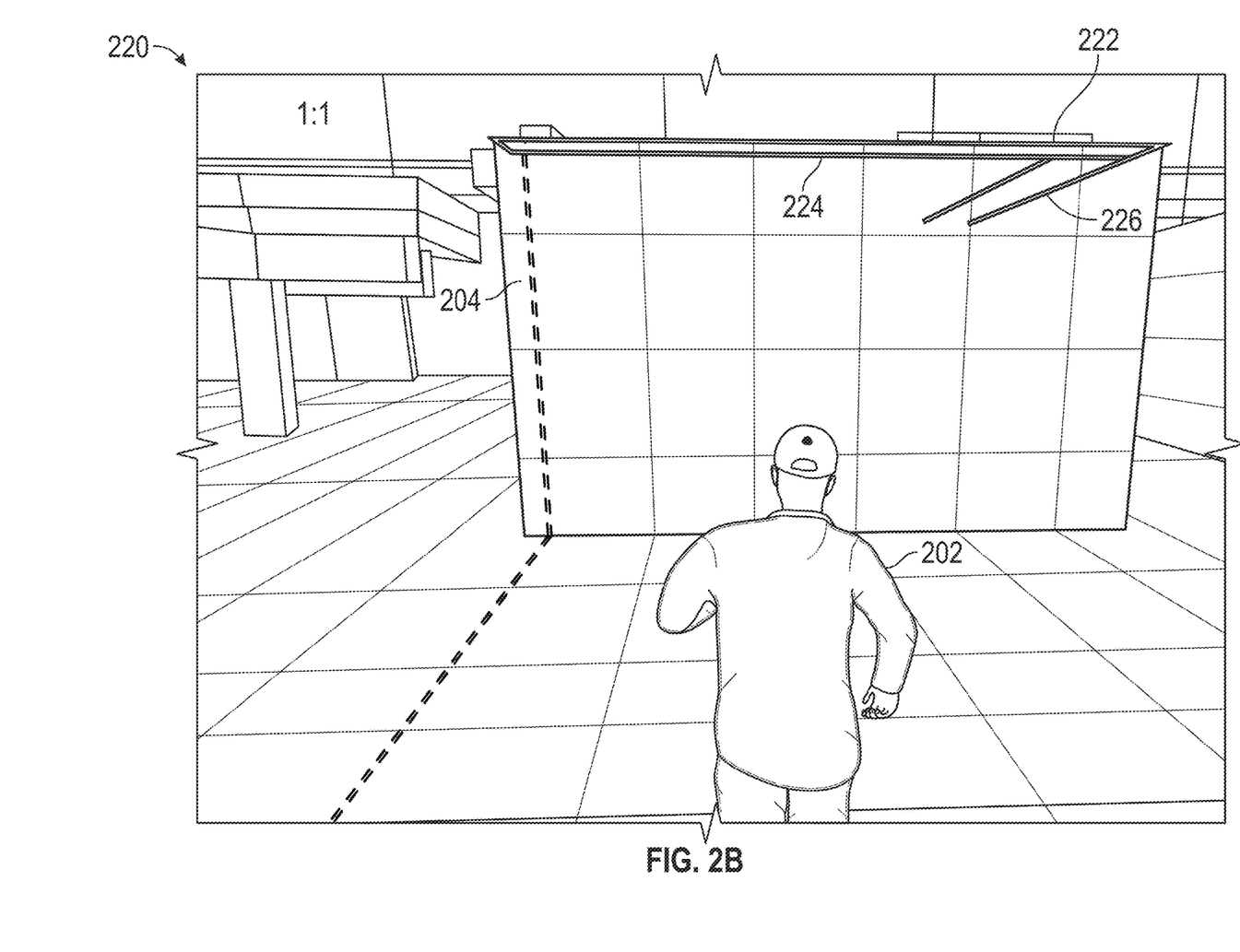
Figure 2C:
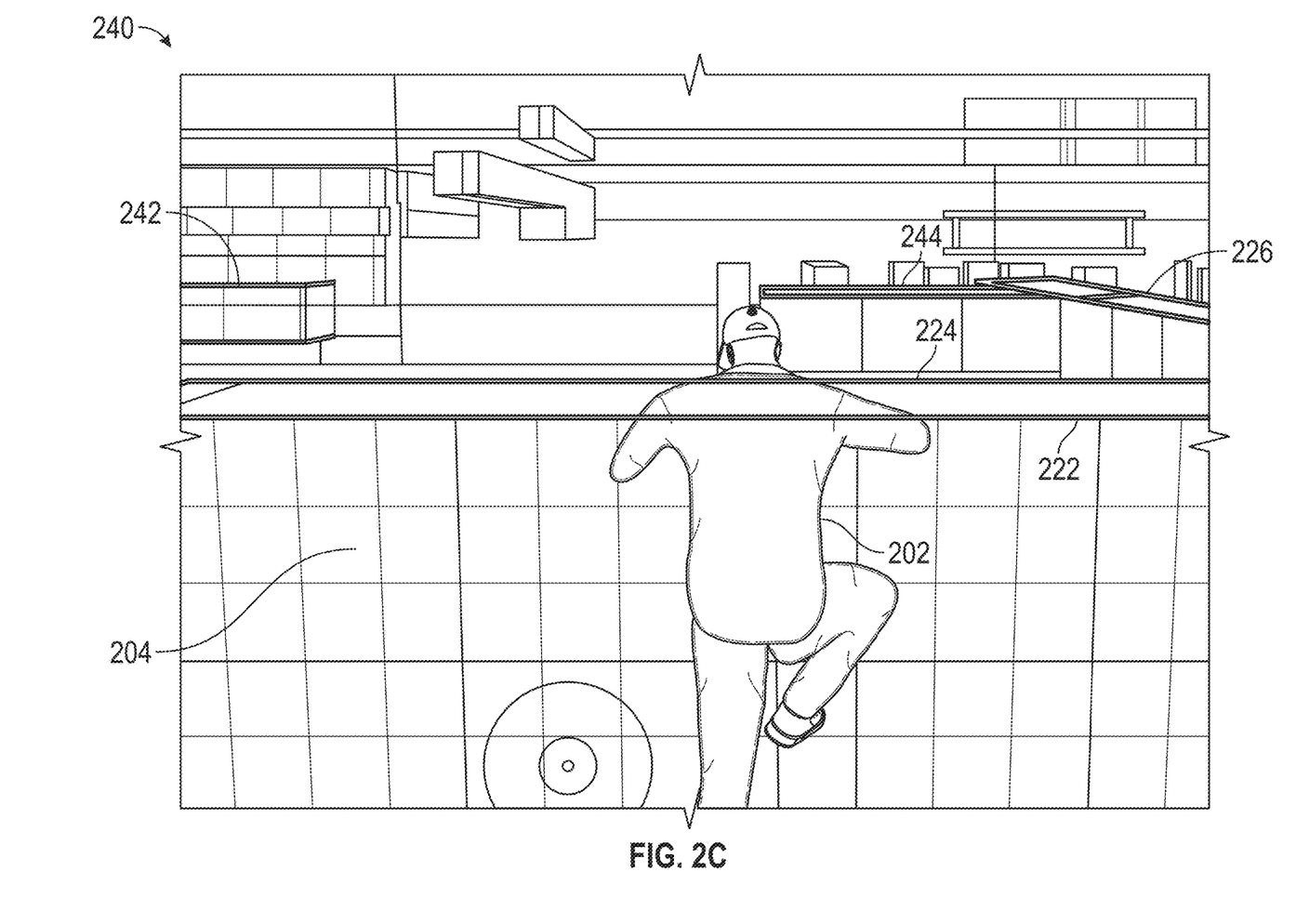

FIGS. 2A-2C illustrate example views 200, 220, and 240 of a virtual environment in which interactable environment geometry (IEG) detection may be performed during game play, in accordance with example embodiments of the disclosure.

In FIG. 2A, an example view 200 is illustrated that shows a virtual environment including an avatar 202 of a player and a wall 204 that has just been added to the virtual environment. At the point in game play illustrated in view 200, the wall 204 may be outside the area of the potential IEG feature detection being performed for the avatar 202. As such, no potential IEG features may be detected by the potential IEG feature detection.

FIG. 2B illustrates an example view 220 of the virtual environment including the avatar 202 of the player and the wall 204 after the avatar 202 has approached the wall 204 in response to input from the player associated with avatar 202.

As illustrated, the wall 204 now falls within the area of the potential IEG feature detection being performed for the avatar 202. As such, the potential IEG feature detection being performed for the avatar 202 may detect potential IEG features of the wall 204 including a front edge 222 of the wall 204, a back edge 224 of the wall 204 and a side edge 226 of the wall 204, among others. As discussed above, the potential IEG features may be stored to the IEG feature cache as unprocessed IEG features.

An IEG feature determination operation may then determine, for individual unprocessed IEG features (e.g., edges 222-226), which types(s) of interactions can be performed for the unprocessed IEG features. Of note, the IEG feature determination operation may determine that front edge 222 is interactable for mantling, hanging, shimmying, climbing, mounting, and vaulting. However, because of the height of the wall 204, the IEG feature determination operation may determine the front edge 222 is not interactable for skateboard grinding. The IEG feature determination operation may also determine a mantle up and over interaction for the front edge 222 of the wall 204 is valid because a parallel edge (e.g., back edge 224 on the other side of the wall 204 is within a threshold distances from the front edge 222 of the wall 204. Moreover, a shimmy transition interaction may be determined to be available for the front edge 222 to the side edge 226.

An available interaction operation may then be performed for avatar 202 with respect to the wall 204. For discussion purposes, it may be assumed that, at the time illustrated in FIG. 2B, interactions with wall 204, such as the mantle and hang operation are unavailable for the avatar 202 because of the distance to the wall 204.

At a point between view 220 of FIG. 2B and the view 240 illustrated in FIG. 2C, the mantle and hang interaction may be determined to be available and input is received from the player of avatar 202 to perform the mantle and hang interaction.

FIG. 2C illustrates an example view 240 of the virtual environment including the avatar 202 of the player and the wall 204 after the avatar 202 has approached the wall 204 and performed a mantle and hang interaction in response to input from the player associated with avatar 202. As illustrated, the avatar 202 is now hanging from the wall 204. Further, the potential IEG feature detection being performed for the avatar 202 may now detect the edges 242 and 244.

Figure 3:
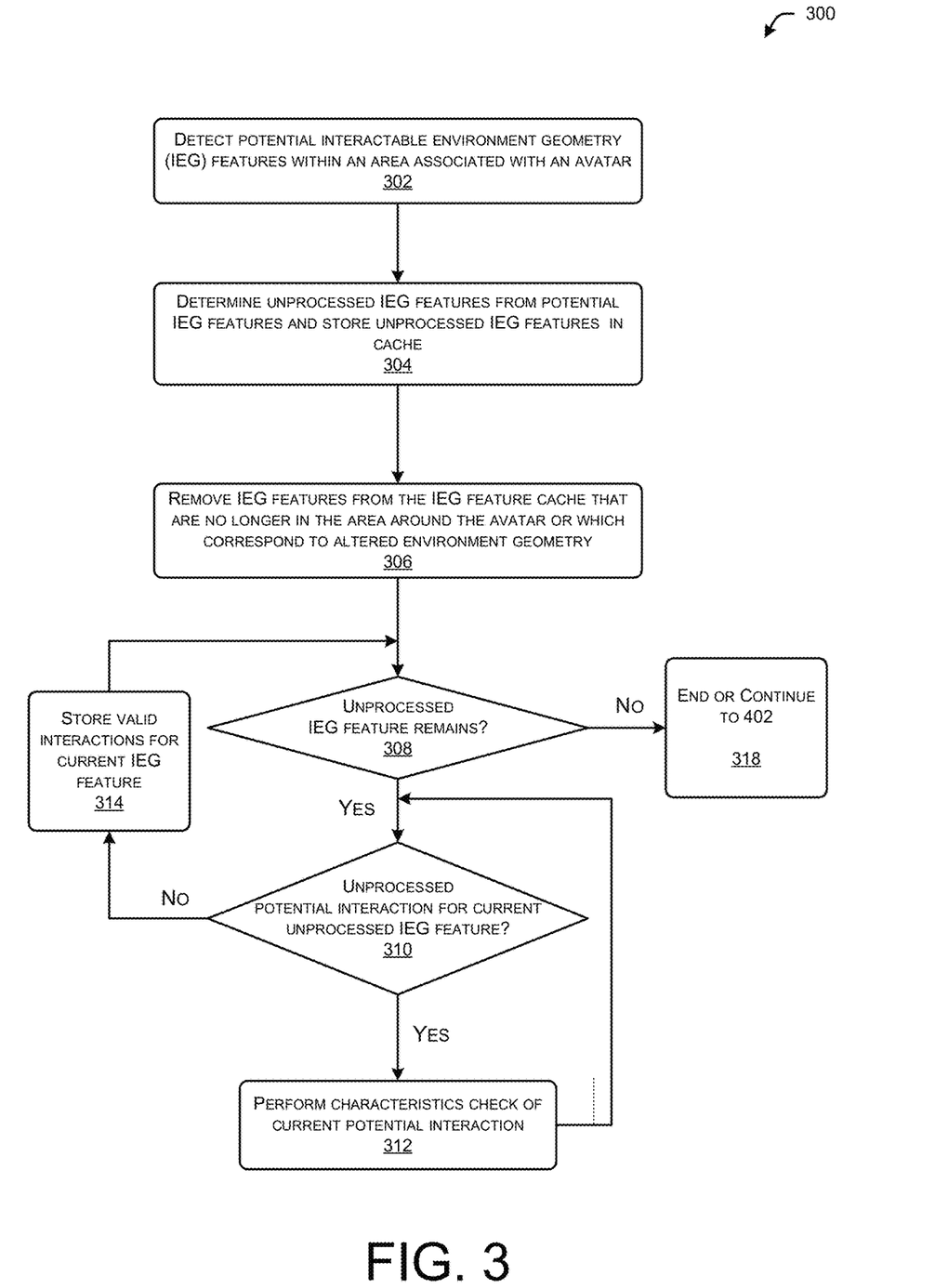
FIG. 3 illustrates a flow diagram of an example method that may provide for IEG detection, in accordance with example embodiments of the disclosure.

FIG. 3 illustrates a flow diagram of an example method 300 that may provide for interactable environment geometry (IEG) detection, in accordance with example embodiments of the disclosure. The method 300 may be performed by the devices of the environment 100. More particularly, the method 300 may relate to the operations of a game system(s) 110 or game client device(s) 130 and may be performed as discussed above.

At block 302, the IEG detection system may detect potential interactable environment geometry (IEG) features in the environment within an area associated with an avatar (e.g., a player controlled or computer controlled avatar). The IEG detection system may determine unprocessed IEG features from the potential IEG features and store the unprocessed IEG features in IEG feature cache at block 304. For example, the IEG detection system may determine potential IEG features not present in the IEG feature cache and/or reduce or combine potential IEG features as discussed above. The IEG detection system may also remove IEG features from the IEG feature cache that are no longer in the area around the avatar or which correspond to altered environment geometry at block 306.

At block 308, the IEG detection system may determine whether one or more unprocessed IEG feature remain unprocessed. If so, the process may continue to block 310. Otherwise, the process may continue to block 318.

At block 310, the IEG detection system may then determine whether an unprocessed potential interaction for the current unprocessed IEG feature remains unprocessed. If so, the process may continue to block 312. Otherwise, the process may continue to block 314.

At block 312, the IEG detection system may perform a characteristics check of the current potential interaction and the current unprocessed IEG feature to determine the validity of an the current potential interaction for the current unprocessed IEG feature. The process may then return to block 308.

Returning to block 314 (reached via "No" at block 310), the IEG detection system may store any valid interactions for current IEG feature in the IEG feature cache.

Figure 4:
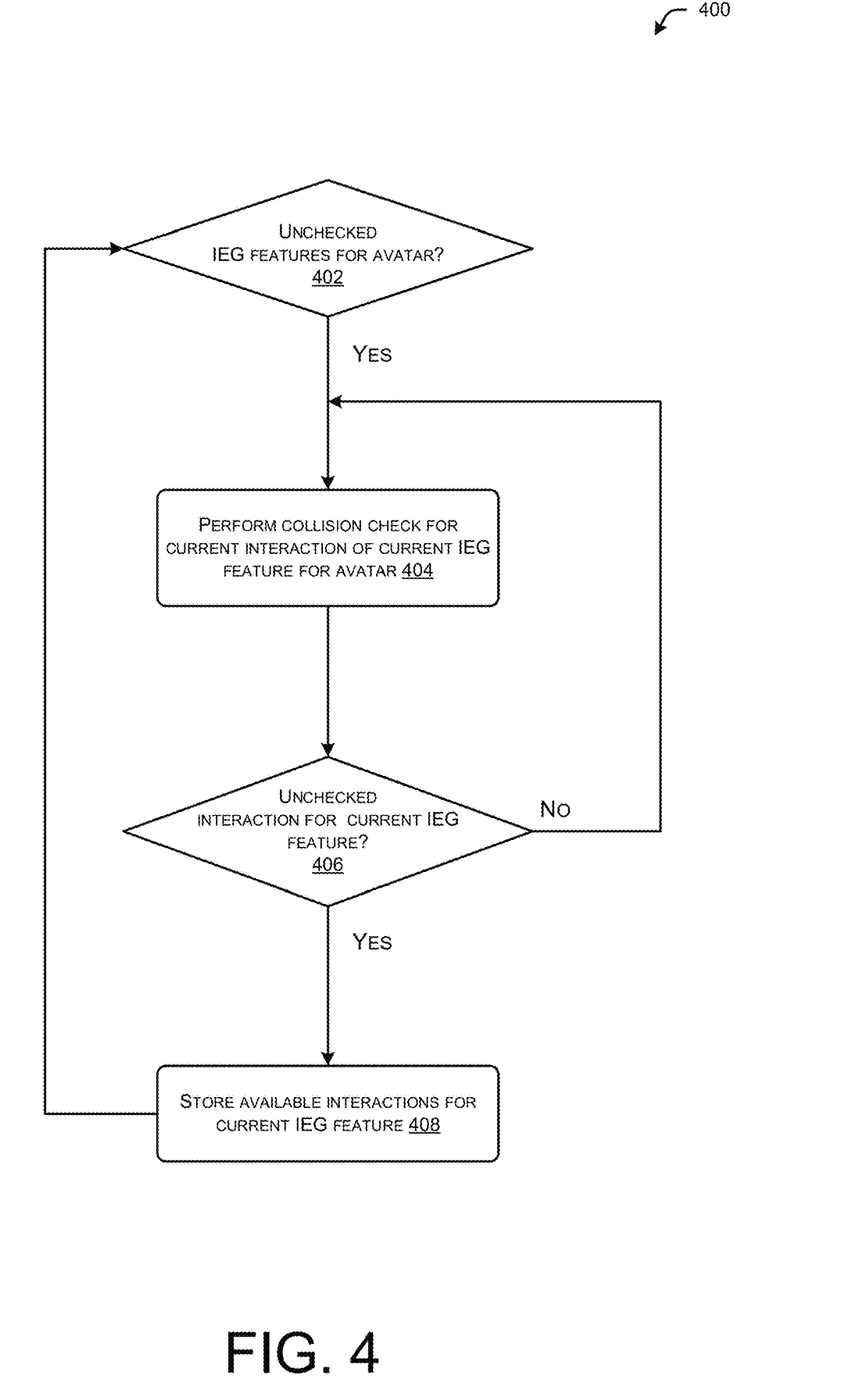
FIG. 4 illustrates a flow diagram of an example method 400 that may provide for IEG detection, in accordance with example embodiments of the disclosure.

Returning to block 318 (reached via "No" at block 308), the IEG detection system may end the process for the current iteration of IEG detection or continue to block 402 of FIG. 4.

FIG. 4 illustrates a flow diagram of an example method 400 that provide for interactable environment geometry (IEG) detection, in accordance with example embodiments of the disclosure. The method 400 may be performed by the devices of the environment 100. More particularly, the method 400 may relate to the operations of a game system(s) 110 or game client device(s) 130 and may be performed as discussed above. Further, process 400 may be performed after process 300 of FIG. 3 and with regard to the IEG features stored in the IEG feature cache.

At block 402, the IEG detection system may determine whether one or more unchecked IEG features remain for an avatar. If so, the process may continue to block 404. Otherwise, the process may end. Following the process 400, the available interactions for the IEG features determined in process 400 may be utilized for controlling the avatar in the virtual environment as discussed above regarding FIGS. 1-2C.

At block 404, the IEG detection system may perform a collision check for a current interaction of the current IEG feature for the avatar to determine if the current interaction is available.

At block 406, the IEG detection system may then determine if an unchecked interaction remains for the current IEG feature. If so, the process may continue to block 408. Otherwise, the process may return to block 402.

At block 408, the IEG detection system may store any available interactions for the current IEG feature. The process may then return to block 402.

It should be noted that some of the operations of methods 300-400 may be performed out of the order presented, with additional elements, and/or without some elements. Some of the operations of methods 300-400 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
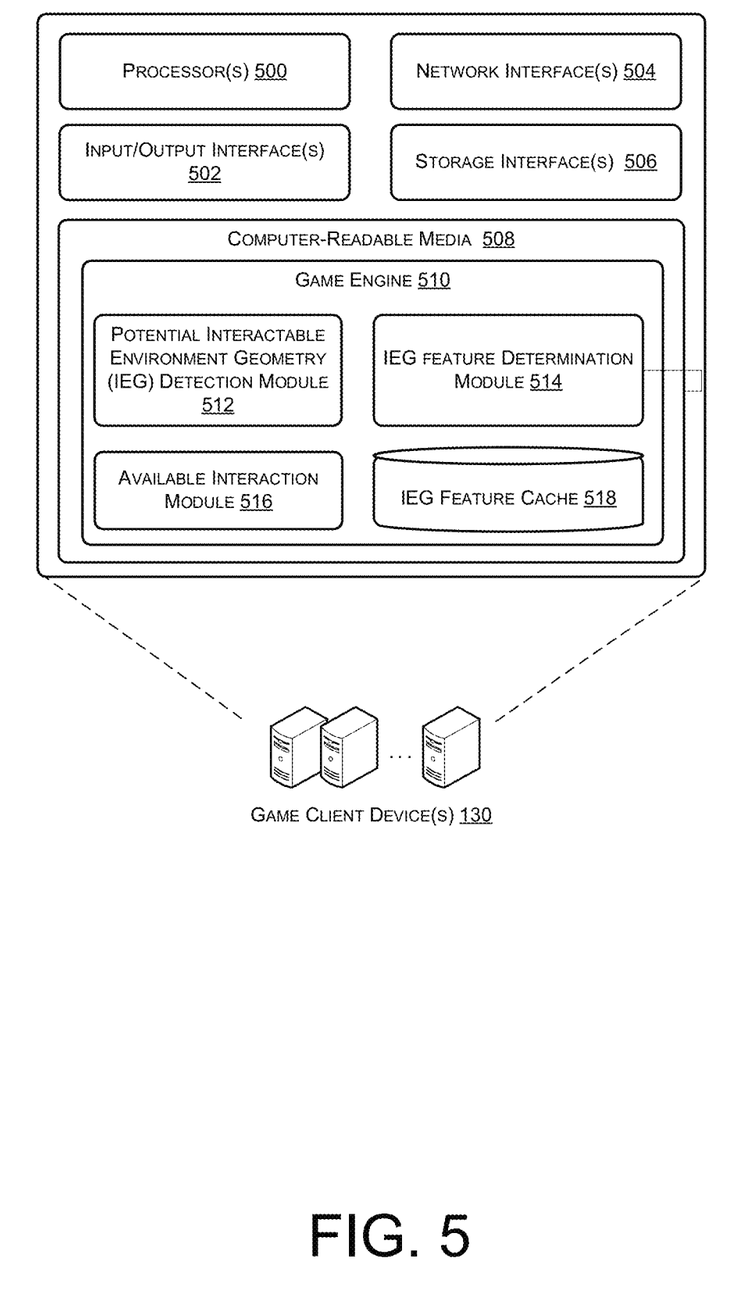
FIG. 5 illustrates a block diagram of example game client device(s) that may provide for IEG detection, in accordance with example embodiments of the disclosure.

FIG. 5 illustrates a block diagram of example game client device 130 that may provide for interactable environment geometry (IEG) detection, in accordance with examples of the disclosure. The game client device(s) 130 may include one or more processor(s) 500, one or more input/output (I/O) interface(s) 502, one or more network interface(s) 504, one or more storage interface(s) 506, and computer-readable media 508.

In some implementations, the processor(s) 500 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 500 may possess its own local memory, which also may store program modules, program data, and/or one or more operating system(s). The one or more processor(s) 500 may include one or more cores.

The one or more input/output (I/O) interface(s) 502 may enable the game client device(s) 130 to detect interaction with a user and/or other system(s), such as one or more game system(s) 110. The I/O interface(s) 502 may include a combination of hardware, software, and/or firmware and may include software drivers for enabling the operation of any variety of I/O device(s) integrated on the game client device(s) 130 or with which the game client device(s) 130 interact, such as displays, microphones, speakers, cameras, switches, and any other variety of sensors, or the like.

The network interface(s) 504 may enable the game client device(s) 130 to communicate via the one or more network(s). The network interface(s) 504 may include a combination of hardware, software, and/or firmware and may include software drivers for enabling any variety of protocol-based communications, and any variety of wireline and/or wireless ports/antennas. For example, the network interface(s) 504 may comprise one or more of a cellular radio, a wireless (e.g., IEEE 802.1x-based) interface, a Bluetooth® interface, and the like. In some embodiments, the network interface(s) 504 may include radio frequency (RF) circuitry that allows the game client device(s) 130 to transition between various standards. The network interface(s) 504 may further enable the game client device(s) 130 to communicate over circuit-switch domains and/or packet-switch domains.

The storage interface(s) 506 may enable the processor(s) 500 to interface and exchange data with the computer-readable medium 508, as well as any storage device(s) external to the game client device(s) 130.

The computer-readable media 508 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 508 may be implemented as computer-readable storage media (CRSM), which may be any available physical media accessible by the processor(s) 500 to execute instructions stored on the computer readable media 508. In one basic implementation, CRSM may include RAM and Flash memory. In other implementations, CRSM may include, but is not limited to, ROM, EEPROM, or any other tangible medium which can be used to store the desired information and which can be accessed by the processor(s) 500. The computer-readable media 508 may have an operating system (OS) and/or a variety of suitable applications stored thereon. The OS, when executed by the processor(s) 500 may enable management of hardware and/or software resources of the game client device(s) 130.

Several functional blocks having instruction, data stores, and so forth may be stored within the computer-readable media 508 and configured to execute on the processor(s) 500. The computer readable media 508 may have stored thereon a game engine 510 that may include a potential interactable environment geometry (IEG) detection module 512, an IEG feature determination module 514, an available interaction module 516, and an IEG feature cache 518. It will be appreciated that each of the functional blocks 510-516 may have instructions stored therein that, when executed by the processor(s) 500, may enable various functions pertaining to the operations of the game client device(s) 130 discussed above.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more non-transitory computer-readable media storing computer-executable instructions that, when executed by the one or more processors, cause the one or more processors to perform operations comprising:

detecting one or more potentially interactable environment geometry (IEG) features in an area of a virtual environment of a game including an avatar of a player;
adding the one or more potentially IEG features to an IEG feature cache;
determining, for an IEG feature of the one or more potentially IEG features in the IEG feature cache, one or more potential interactions that are valid for the IEG feature, the determining that an individual potential interaction of the one or more potential interactions is a valid interaction for the IEG feature being based on collision checking and corresponding criteria of the individual potential interactions;
determining, based at least in part on a position of the avatar in the virtual environment, whether the valid interaction for the IEG feature is available for the avatar;
determining content based on the avatar and on the IEG feature; and
rendering the content for display.

2. The system of claim 1, wherein the one or more potentially IEG features are edges or surfaces of the virtual environment.

3. The system of claim 1, wherein:
the detecting the one or more potentially IEG features was a first detecting during a game play session of the player;
the operations further comprising:
  detecting, during the game play session of the player, one or more additional potentially IEG features in the area of the virtual environment, wherein the one or more additional potentially IEG features are associated with a change to at least a portion of the virtual environment that occurred subsequent to the first detecting and during the game play session of the player; and
  determining, for another IEG feature of the one or more additional potentially IEG features, an additional potential interaction that is another valid interaction for the other IEG feature.

4. The system of claim 3, wherein the change to at least the portion of the virtual environment that occurred subsequent to the first detecting and during the game play session of the player was associated with an input of another player associated with the virtual environment of the game.

5. The system of claim 1, wherein the area of the virtual environment is determined based at least in part on the position of the avatar in the virtual environment and is an area around the avatar.

6. The system of claim 1, the operations further comprising:
determining, subsequent to the avatar moving from the position to another position, the valid interaction for the IEG feature is unavailable for the avatar based on an obstruction between the other position and the IEG feature.

7. The system of claim 1, wherein the corresponding criteria of the valid interaction of the IEG feature includes at least a relative location of another environment geometry feature.

8. A computer-implemented method comprising:
detecting one or more potentially interactable environment geometry (IEG) features in an area of a virtual environment of a game including an avatar of a player;
adding the one or more potentially IEG features to an IEG feature cache;
determining, for an IEG feature of the one or more potentially IEG features, one or more potential interactions that are valid for the IEG feature, the determining that an individual potential interaction of the one or more potential interactions is a valid interaction for the IEG feature being based on collision checking and corresponding criteria of the individual potential interactions;
determining, based at least in part on a position of the avatar in the virtual environment, whether the valid interaction for the IEG feature is available for the avatar;
determining content based on the avatar and on the IEG feature; and
rendering the content for display.

9. The computer-implemented method of claim 8, wherein the one or more potentially IEG features are edges or surfaces of the virtual environment.

10. The computer-implemented method of claim 8, wherein:
the detecting the one or more potentially IEG features is a first detecting during a game play session of the player; and
the method further comprising:
  detecting, during the game play session of the player, one or more additional potentially IEG features in the area of the virtual environment, wherein the one or more potentially IEG features are associated with a change to at least a portion of the virtual environment that occurred subsequent to the first detecting and during the game play session of the player; and
  determining, for another IEG feature of the one or more additional potentially IEG features, an additional potential interaction that is another valid interaction for the other IEG feature.

11. The computer-implemented method of claim 10, wherein the change to at least the portion of the virtual environment that occurred subsequent to the first detecting and during the game play session of the player was associated with an input of another player associated with the virtual environment of the game.

12. The computer-implemented method of claim 8, wherein the area of the virtual environment is determined based at least in part on the position of the avatar in the virtual environment and is an area around the avatar.

13. The computer-implemented method of claim 8, further comprising:
determining, subsequent to the avatar moving from the position to another position, the valid interaction for the IEG feature is unavailable for the avatar based on an obstruction between the other position and the IEG feature.

14. The computer-implemented method of claim 8, wherein the corresponding criteria of the valid interaction of the IEG feature includes at least a relative location of another environment geometry feature.

15. One or more non-transitory computer-readable media storing computer-executable instructions that, when executed by one or more processors, cause the one or more processors to perform operations comprising:
detecting one or more potentially interactable environment geometry (IEG) features in an area of a virtual environment of a game including an avatar of a player;
adding the one or more potentially IEG features to an IEG feature cache;
determining, for an IEG feature of the one or more potentially IEG features, one or more potential interactions that are valid for the IEG feature, the determining that an individual potential interaction of the one or more potential interactions is a valid interaction for the IEG feature being based on collision checking and corresponding criteria of the individual potential interactions; and determining, based at least in part on a position of the avatar in the virtual environment, whether the valid interaction for the IEG feature is available for the avatar;

determining content based on the avatar and on the IEG feature; and rendering the content for display.

16. The one or more non-transitory computer-readable media of claim 15, wherein the one or more potentially IEG features are edges or surfaces of the virtual environment.

17. The one or more non-transitory computer-readable media of claim 15, wherein:

the detecting the one or more potentially IEG features was a first detecting during a game play session of the player;

the operations further comprising:

detecting, during the game play session of the player, one or more additional potentially IEG features in the area of the virtual environment, wherein the one or more potentially IEG features are associated with a change to at least a portion of the virtual environment that occurred subsequent to the first detecting and during the game play session of the player; and determining, for another IEG feature of the one or more additional potentially IEG features, an additional potential interaction that is another valid interaction for the other IEG feature.

18. The one or more non-transitory computer-readable media of claim 17, wherein the change to at least the portion of the virtual environment that occurred subsequent to the first detecting and during the game play session of the player was associated with an input of another player associated with the virtual environment of the game.

19. The one or more non-transitory computer-readable media of claim 15, the operations further comprising:

determining, subsequent to the avatar moving from the position to another position, the valid interaction for the IEG feature is unavailable for the avatar based on an obstruction between the other position and the IEG feature.

20. The one or more computer-readable media of claim 15, the operations further comprising:

updating the one or more potentially IEG features in the IEG feature cache based at least in part on movement of the avatar in the virtual environment or based at least in part on one or more changes to a geometry of the virtual environment.

\* \* \* \* \*